United States Patent [19] [11] 3,714,958
Johnson et al. [45] Feb. 6, 1973

[54] MIXING VALVE ASSEMBLY

[75] Inventors: Tom W. Johnson; Joe L. Johnson, both of Burton, Ohio

[73] Assignee: Sajar Plastics, Inc., Middlefield, Ohio

[22] Filed: March 1, 1972

[21] Appl. No.: 230,592

Related U.S. Application Data

[63] Continuation-in-part of Ser. No. 101,810, Dec. 28, 1970, abandoned.

[52] U.S. Cl. ..................137/315, 137/606, 285/27, 285/423
[51] Int. Cl..............................................F16k 19/00
[58] Field of Search ...137/315, 606; 285/24, 27, 423

[56] References Cited

UNITED STATES PATENTS 3,117,587  1/1964  Willinger..............................137/315
3,229,710  1/1966  Keller................................137/606 X
3,369,828  2/1968  Trickey............................285/423 X Primary Examiner—Robert G. Nilson
Attorney—James G. Watterson et al.

[57] ABSTRACT

A mixing valve assembly constructed of plastic parts in which end pieces that form valve bodies receive the ends of conduits of a mixing chamber. Ends of the conduits are received in recesses of the end pieces, are secured by an adhesive or solvent, oriented by mating non-circular portions, and sealed by both the adhesive or solvent and an O-ring between each conduit and the connected end piece. In addition, the parts can be further secured and sealed by an ultrasonic weld.

6 Claims, 4 Drawing Figures

PATENTED FEB 6 1973 3,714,958

MIXING VALVE ASSEMBLY

CROSS REFERENCE TO RELATED APPLICATION

This application is a continuation in part of application Ser. No. 101,810, filed Dec. 28, 1970, now abandoned and continuation application Ser. No. 234,073, filed Mar. 12, 1972, substituted therefor.

BACKGROUND OF THE INVENTION

1. Field of the Invention

This invention relates to valve assemblies and more particularly to a plastic underbody mixing valve assembly.

2. Prior Art

Mixing valve underbodies, that is, valves and conduits that form the plumbing part of faucet fixtures, are typically made of metal, such as brass. Such underbodies are usually in part located beneath a sink flange or the like, and extending parts are covered with decorative casings or hoods. With the advent of plastic materials and injection molding techniques, there has been some general recognition of the desirability of utilizing the lighter, less expensive, plastic materials in various plumbing applications. The inertness of plastic materials and the ability to injection mold such materials to close tolerances, which eliminates many subsequent fabricating steps, such as threading and machining, have made their use particularly attractive. Nevertheless, certain problems exist in providing suitable plastic fixtures, due to limitations on the shapes that can be injection molded and for the need in providing suitable connections between separate parts of assemblies, especially where parts are not threaded together. Two approaches to fabricating plastic valve assemblies are shown in U. S. Pat. Nos. 3,229,710 and 3,448,768.

SUMMARY OF THE INVENTION

The present invention is directed to a new and improved plastic valve assembly, and more particularly to a plastic underbody mixing valve assembly, adapted for injection molding, and in which ease of assembly is provided and a water-tight seal between assembled parts assured, by the use of both an O-ring seal and an adhesive or solvent bonding of parts, at the junctures of parts forming the assembly. Additional bonding of the assembled parts is achieved in one embodiment of the invention with a weld at the bonded junctures. Complete reliance upon a plastic-to-plastic bond to provide a seal between parts is made unnecessary by the use of the O-ring seal, which assures that any loss in the integrity of the bond formed by the adhesive or solvent and the weld if present, due, for example, to aging, heat, mechanical stresses, or the like, will not result in leakage, as long as the parts remain assembled.

When parts can be preassembled, welding at the juncture between parts provides additional assurance that the parts will remain together and watertight. On the other hand, adhesive or solvent bonding of the assembled parts without welding has the advantage of permitting on-site assembly and the selection and use of interchangeable parts, for example, different valve bodies or a mixing chamber with shorter conduits to space the valves a different distance apart for a particular installation. It also makes practical the marketing of the assembly in kit form for home assembly.

An especially good seal and strong bond are provided, and a positive orientation of the assembled parts in proper relationship is obtained, by providing a recess in each end piece that forms a valve member of a mixing valve assembly, which recess receives an end of a conduit from a mixing chamber of the assembly. Each recess is in part cylindrical and in part noncylindrical. The end of each conduit receivable in the recesses is similarly shaped for a close, mating, fit. The noncircular parts orient the end pieces, which in the preferred construction are identically constructed, so that the parts cannot be assembled improperly. The cylindrical portions of each recess and conduit end facilitate an O-ring seal, which assures a watertight connection that is independent of the adhesive or solvent bond or weld. In the preferred construction, the solvent or adhesive bond, when used, is restricted to the noncylindrical mating portions of the parts. When the parts are welded, the weld is formed between radially opposed surfaces of the assembled parts.

From the foregoing, it will be appreciated that a principal object of this invention is the provision of a plastic valve assembly in which parts can be injection molded, can be conveniently and easily assembled, and connected securely and tightly to provide a reliable, watertight, seal.

This and other objects, features and advantages of this invention will become more apparent from the detailed description that follows, when considered in connection with the accompanying drawings.

DETAILED DESCRIPTION OF A PREFERRED EMBODIMENT

Figure 1:
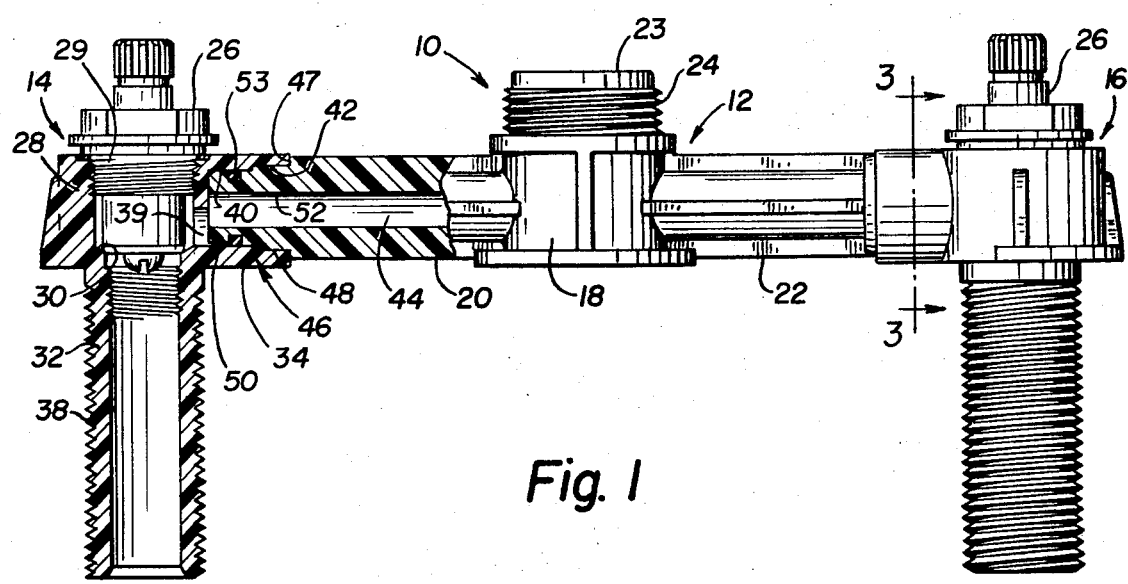
FIG. 1 is a front elevational view with parts in section of an embodiment of the present invention.
Figure 2:
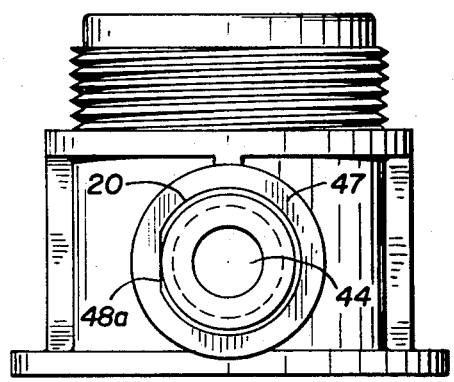
FIG. 2 is an end elevational view of the center piece of the embodiment shown in FIG. 1, as viewed from the left-hand side.
Figure 3:
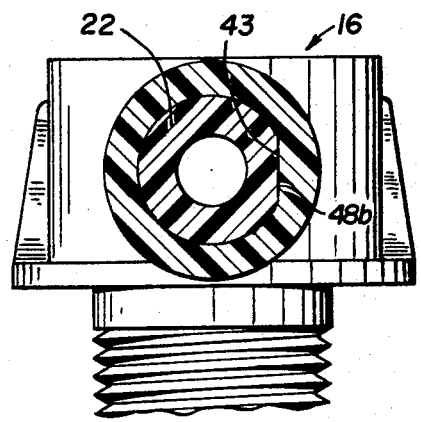
FIG. 3 is a transverse sectional view taken along the line 3—3 in FIG. 1.

A mixing valve underbody 10 embodying the present invention and suitable for being secured in assembled relationship without welding is shown in FIGS. 1 to 3 of the drawings. The underbody 10 forms a faucet fixture for sinks or the like to control and mix flows of hot and cold water. The preferred embodiment is formed of three pieces, a center piece 12 and two identical end pieces 14, 16. The three pieces are injection molded of suitable plastic material, such as ARLON T, which is a polyarylether manufactured and sold by Uniroyal Company and having properties that will withstand relatively high temperatures on the order of 300 degrees Fahrenheit without distortion which can be suitably constructed for present purposes for use with fluid pressures as high as 260 pounds per square inch.

The center piece 12 includes a mixing chamber 18 and two integral conduit portions 20, 22 that communicate therewith. The mixing chamber 18 has an outlet 23 adapted to receive a spout (not shown) for swiveling movement. External threads 24 about the outlet 23 receive a threaded spout retainer. The conduit portions 20, 22 are tubular, extend from the mixing chamber in opposite directions from each other in the embodiment shown, and are constructed to communicate with and be connected to the two end pieces 14, 16.

Both of the end pieces 14, 16 are identical and each receives an end of one of the conduit portions 20, 22 and forms a valve body adapted to be coupled to a water line. Each valve body receives a valve unit 26 for controlling the flow of liquid through the end piece. Since the pieces 14, 16 are identical, only the end piece 14 will be described in detail.

As best shown in FIG. 1, the end piece 14 has a valve body portion 28 that is cylindrical in configuration, with internal threads 29 at one end (the upper end in the orientation shown), which threadedly receive the valve unit 26. An annular conical surface 30 is formed at the opposite end of the valve body from the internal threads 29 to receive a seat insert or alternatively to act as a seating surface for a flow control member.

An axially aligned pipe portion 32 and a transverse pipe portion 34 extend from the valve body portion 28 of the end piece 14. The axially aligned pipe portion 32 includes internal threads 36 for receiving an insert or adaptor having a valve seat, and external threads 38 for coupling the end body to a water line. The transverse pipe portion 34 is constructed to receive the end of the conduit portion 20 of the center piece and both pipe portions 32 and 34 provide communication to the valve body portion 28 on opposite sides of the valve seat. The transverse pipe portion 34 communicates to the valve body through an orifice 39 of smaller cross sectional area than the pipe portion proper and located axially off-center therefrom, as shown in FIG. 1, to provide sufficient axial depth for the internal threads 29 at the one end of the valve body portion.

To facilitate the use of the end pieces 14, 16 with underbodies of various valve spacings, the transverse pipe portion 34 is of minimum length, substantially shorter than the conduit portion 20 in the depicted embodiment, which will vary in length depending upon the valve spacing desired. The short pipe portion 34 forms a recess or receptacle and has a stepped, smooth, internal surface that receives the end of the conduit portion 20. The stepped internal surface comprises a cylindrical part 40 adjacent the orifice 39 and a noncylindrical part 42 axially outward from the cylindrical inner part 40. In the preferred embodiment, the noncylindrical part 42 is cylindrical except for a flat portion, which is located on one side, as shown at 43 in FIG. 3 in connection with the identical end piece 16.

The conduit 20 of the center piece 12 and associated with the end piece 14 has a central passageway 44 that extends the length of the conduit and opens into the mixing chamber 18. The distal end of the conduit portion terminates in a nipple 46 of reduced diameter, that extends from a radial shoulder 47. A portion 48 of the nipple 46 adjacent the shoulder 47 is noncylindrical in external contour and is shaped of a mating configuration with the axially outer part 42 of the transverse pipe portion 34. That is, it is cylindrical except for a flat portion 48a on one side (the side facing rearwardly in the orientation of FIG. 1). See FIG. 2. The corresponding flat portion 48b of the conduit 22 is oppositely disposed, as shown in FIG. 3, opposite the flat portion 43. This permits the use of identical end pieces and assures that they cannot be improperly oriented. The noncylindrical portion 48 is of an axial length equal to that of the recess portion 42 and of a very slightly smaller outside diameter, so as to be receivable therein with a close fit. A terminal portion 50 of the nipple 46 is cylindrical in external configuration and of smaller diameter than the noncylindrical portion 48. The outside diameter is slightly smaller than the inside diameter of the recess portion 40 to provide a close circumferential fit. The axial length of the terminal portion 50 corresponds to that of the cylindrical, axially inner, part 40 of the transverse pipe portion 34. An annular groove 52 is formed in the cylindrical terminal portion 50 and receives an elastomeric O-ring 53.

The center piece 12 and two end pieces 14, 16 are assembled and secured together by inserting the portions 46 into the transverse pipe portions 34. In assembled condition, as shown in FIG. 1, the radial shoulders 47 will abut the ends of the transverse pipe portions 34 and the O-rings 53 will engage the internal cylindrical surface of the inner part 40 of each recess formed by the transverse pipe portions. With this relationship, the O-rings 53 will form a watertight seal between each end piece and the associated conduit portion of the center piece and prevent the leakage of fluid between the pieces, when subjected to the typical water pressures of plumbing systems in which such underbodies are used. The larger portion 48 adjacent the shoulder 47 and received in the noncylindrical part 42 of the transverse pipe portion is bonded to the transverse pipe portion by an adhesive or solvent, which is preferably limited in its location essentially to the noncylindrical portion of the nipple and its mating part of the respective transverse conduit portion 20, 22. The adhesive or solvent provides a localized bond that secures each end piece to the associated conduit portion and that acts as a further seal to the O-ring, to provide a double seal against leakage.

Figure 4:
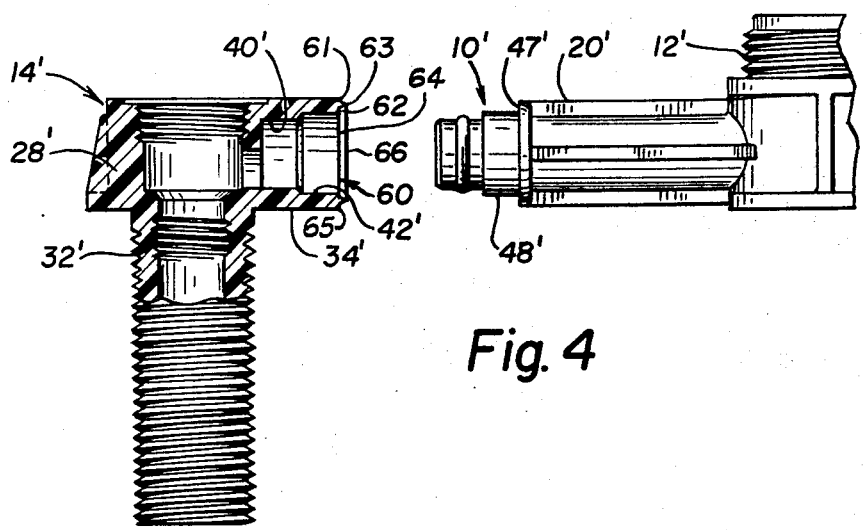
FIG. 4 is a partial front elevational view, with portions in section, of a second embodiment of the present invention showing parts prior to assembly that are suitable for being welded together.

Another embodiment of the invention is shown in FIG. 4 of the drawings, of similar construction to that shown in FIGS. 1-3, but modified to facilitate the ultrasonic welding of the parts. With reference to FIG. 4, parts of the assembly identical to corresponding parts of the embodiment shown in FIGS. 1-3 will be identified with the same reference numeral and a prime designation, and such parts will not be described in detail, in view of the previous description. Only the left-hand side of the assembly 10' is shown; the opposite or right-hand side corresponding in a manner analogous to the manner in which the right-hand side of the assembly 10 of FIG. 1 corresponds to the left-hand side.

The end piece 14' has a valve body portion 28' with two extending pipe portions 32' and 34', the pipe portion 34' being adapted to receive the end of a conduit portion 20' of a center piece 12'. For that purpose the pipe portion 34' has a recess comprised of a cylindrical part 40' and a noncylindrical part 42'. The distal end of the portion 34' terminates in an annular surface 60 that has two flat portions 61, 62 and an annular bead 63 that is located between the two flat portions, approximately midway between inside and outside circumferential edges 64, 65 of the end surface. The bead 63 tapers outwardly of the flat end surface portions and terminates in a circular line or edge 66. In the preferred embodiment, the bead 63 extends from the end surface a distance approximately equal to the cross sectional width of the bead at its base, between portions 61, 62. By way of example, a bead 63, 0.015 inch wide at its base, is satisfactory for a mixing valve assembly of a size suitable for typical home or commercial use.

In assembling the parts 28' and 12', the end of the conduit portion 20' is inserted into the recess comprised of the parts 40' and 42' of the pipe portion 34', so that the bead 63 abuts the shoulder 47' of the conduit portion 20' of the center piece. One of the parts, e.g., the center piece 12' is then rigidly secured by a holding fixture, which effectively inhibits vibration. The end piece 14' is then forced against the shoulder 47' by the working surface of an ultrasonic welding machine. The machine applies high frequency, e.g., ultrasonic, vibrations to the end piece, imparting high frequency relative motion of extremely small amplitude between the bead 63 and the shoulder 47'. This heats and melts the bead, forming a continuous circumferential leak-proof bond between the end piece and center piece at the shoulder 47'.

By virtue of the above described construction, a multi-piece plastic underbody is provided that can be injection molded, is easily and quickly assembled, and in which the pieces at opposite ends of a center piece are identical in shape and constructed to assure proper orientation upon assembly. The construction provides and assures a watertight connection and seal between the parts, that is not totally dependent upon an adhesive, solvent, or welded bond, and which therefore does not lose effectiveness from aging and strain from mechanical and thermal stresses. With the O-ring seal, close tolerances of the mating parts need not be established or held in order to assure a fluid-tight connection even apart from the welded and/or adhesive or solvent bond, and the mating parts need not be tapered in order to provide a tight seal. As a result, the nipple 46 can always be totally received within the transverse pipe portion 34, with the radial shoulder 47 abutting the end of the pipe portion, assuring a pleasing and finished appearance. Because of the ease of assembly, the unit in which the parts are not welded is particularly adapted for home use and sale in kit form, in which case the ability to form a water-tight seal, notwithstanding an imperfect solvent or adhesive bond between the parts, is extremely important.

While preferred embodiments of the present invention have been described in detail, it will be appreciated that various modifications or alterations can be made therein, without departing from the spirit and scope of the invention as set forth in the appended claims.

We claim:

1. A valve assembly comprising a plastic center piece that forms a mixing chamber; two plastic conduits that extend from the center piece in communication with said mixing chamber; and two plastic end pieces each adapted to form a valve structure, each with a recess for receiving an extending end of one of said two conduits, at least a first portion of said recess being cylindrical and a second portion being noncylindrical; the extending end of each of said conduits having a cylindrical portion adapted to be received in the cylindrical portion of the recess of one of said end pieces and a noncylindrical portion adapted to be received in said second portion to align the end piece in a predetermined orientation relative to the conduit received therein; an annular groove in said cylindrical portion of one of each mating conduit and end piece adapted to receive an O-ring; and generally radially disposed surfaces in facing relationship, one on each end piece and one opposed thereto on each conduit, and a bead between said facing surfaces of each end piece and conduit, each bead being integral with and extending from one facing surface and adapted to contact the adjacent facing surface.

2. A valve assembly comprising a plastic center piece that forms a mixing chamber; two plastic conduits that extend from the center piece in communication with said mixing chamber; and two plastic end pieces each adapted to form a valve structure, each with a recess for receiving an extending end of one of said two conduits, at least a portion of said recess being cylindrical; the extending end of each of said conduits having a cylindrical portion adapted to be received in the cylindrical portion of the recess of one of said end pieces; an annular groove in said cylindrical portion of one of each mating conduit and end piece adapted to receive an O-ring; and generally radially disposed surfaces in facing relationship, one on each end piece and one opposed thereto on each conduit and a continuous bead between said facing surfaces of each end piece and conduit, each bead being integral with and extending from one facing surface and adapted to initially contact the adjacent facing surface and to melt and form a weld between said facing surfaces.

3. A valve assembly comprising a plastic center piece that forms a mixing chamber and two plastic end pieces each adapted to form a valve structure, said center piece and end pieces having interconnected conduit portions, the interconnections therebetween being each comprised of (a) a recess in one conduit portion that receives the end of the connected conduit portion in mating relationship, (b) self alignment means locating the centerpiece and valve structure in predetermined positional relationship, (c) an annular groove in one mating conduit portion of each interconnection, (d) an O-ring in each said annular groove, and (e) a circumferential plastic weld securing said mating conduit portions together.

4. A mixing valve assembly as set forth in claim 3 wherein said circumferential plastic weld is formed between mutually opposed circumferential surfaces one of which is a shoulder on one conduit portion and one of which carries a bead that forms the weld.

5. A mixing valve assembly comprising a plastic mixing chamber having a central portion with a cavity and conduit portion extending therefrom in opposite directions, and two identically constructed plastic end pieces adapted to form valve structure attached one to the end of each conduit portion, each of said end pieces having a central passageway and a transverse passageway in communication therewith, a recess in one of said transverse passageway and attached conduit portion and a radial shoulder and extending nipple at the end of the other, said recess portion formed by a surface of revolution and a surface of nonrevolution axially displaced therefrom, said radial shoulder being abutted and welded throughout an annular area to an end surface of the connected piece and said nipple being shaped to be received in said recess with a close fit, one portion of said nipple being formed of a surface of revolution and containing an annular groove, and another portion of said nipple having a surface of non-revolution, and an O-ring in the annular groove of the nipple.

6. An underbody mixture valve assembly comprising a plastic mixing chamber having a central portion with a cavity and conduit portion extending therefrom in opposite directions, and two identically constructed plastic end pieces adapted to form valve structure attached one to each of said conduit portions, each of said end pieces having a central passageway and a transverse passageway in communication therewith, a stepped recess forming a part of said transverse passageway and having a cylindrical part and a non-cylindrical part axially outward of said cylindrical part; each outer end of said conduit portions having a radial shoulder and a nipple extending therebeyond, said radial shoulder abutting and being welded throughout an annular area to an end surface of the connected end piece and said nipple being received in said stepped recess with a close fit, the outer end portion of said nipple being cylindrical and containing an annular groove and the portion of said nipple adjacent said radial shoulder having a non-cylindrical contour that mates with said noncylindrical part of said recess; and an O-ring in the annular groove of each nipple.

* * * * *